(12) United States Patent
Girard et al.

(10) Patent No.: US 7,963,104 B2
(45) Date of Patent: Jun. 21, 2011

(54) EMISSION CONTROL SYSTEM HAVING A COATED MIXER FOR AN INTERNAL COMBUSTION ENGINE AND METHOD OF USE

(75) Inventors: James W. Girard, Belleville, MI (US); Rachel Alison Snow, Belleville, MI (US); Emil G. Serban, Windsor (CA); Giovanni Cavataio, Dearborn, MI (US); Christine Kay Lambert, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 643 days.

(21) Appl. No.: 12/032,212

(22) Filed: Feb. 15, 2008

(65) Prior Publication Data

US 2009/0205324 A1    Aug. 20, 2009

(51) Int. Cl.
*F01N 3/00* (2006.01)
(52) U.S. Cl. ............ 60/286; 60/274; 60/295; 60/301; 60/303; 422/171; 422/172; 422/182; 422/183
(58) Field of Classification Search .......... 60/274, 60/286, 295, 297, 301, 303, 324; 422/170, 422/171, 172, 182, 183
See application file for complete search history.

(56) References Cited

U.S. PATENT DOCUMENTS

| | | | |
|---|---|---|---|
| 5,209,062 A * | 5/1993 | Vollenweider | 60/280 |
| 6,534,022 B1 * | 3/2003 | Carlborg et al. | 422/180 |
| 6,713,031 B2 | 3/2004 | Harris et al. | |
| 7,240,483 B2 * | 7/2007 | Cizeron et al. | 60/286 |
| 7,380,395 B2 * | 6/2008 | Bruck et al. | 60/286 |
| 7,682,705 B2 * | 3/2010 | Hodgson | 428/593 |
| 2002/0054844 A1 | 5/2002 | Pfeifer et al. | |
| 2005/0069476 A1 | 3/2005 | Blakeman et al. | |
| 2006/0153748 A1 | 7/2006 | Huthwohl et al. | |
| 2006/0257303 A1 | 11/2006 | Telford | |
| 2007/0051096 A1 | 3/2007 | Pfeifer et al. | |
| 2007/0089403 A1 | 4/2007 | Pfeifer et al. | |

FOREIGN PATENT DOCUMENTS

| | | | | |
|---|---|---|---|---|
| EP | 0555746 B1 | 8/1993 | | |
| EP | 0894 523 A1 * | 2/1999 | | 60/286 |

OTHER PUBLICATIONS

"Emitec Technologies Aggressively Reduce Diesel Impact on Environment", PR Newswire, Apr. 11, pp. 1-3.

* cited by examiner

*Primary Examiner* — Binh Q Tran
(74) *Attorney, Agent, or Firm* — Damian Porcari; Brooks Kushman P.C.

(57) ABSTRACT

An emission control system capable of remediating an exhaust from an internal combustion engine and having an exhaust passage, an oxidation catalyst, a reducing agent and a source of the reducing agent cooperating with an aperture in the exhaust passage. The aperture is disposed downstream of the oxidation catalyst. The system also includes a mixer arranged within the exhaust passage downstream of the aperture. The mixer includes a plurality of mixing elements. The mixer also includes a coating capable of hydrolyzing the reducing agent. At least a portion of the mixing elements which have a thermal conductivity greater than 8 W/m/° K. The system includes a selective catalytic reduction (SCR) catalyst disposed downstream from the mixer.

20 Claims, 1 Drawing Sheet

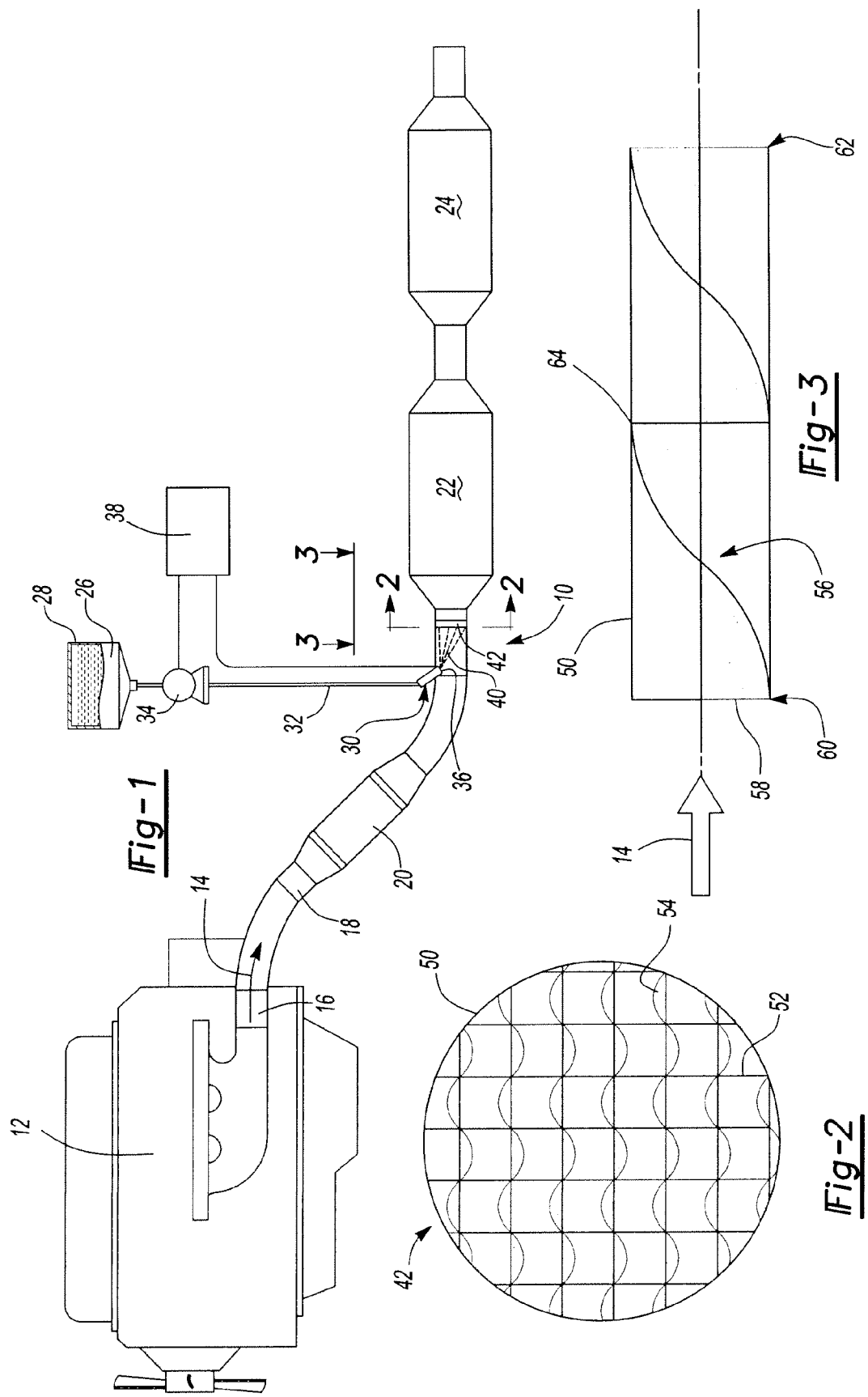

EMISSION CONTROL SYSTEM HAVING A COATED MIXER FOR AN INTERNAL COMBUSTION ENGINE AND METHOD OF USE

BACKGROUND OF THE INVENTION

1. Field of the Invention

One or more embodiments of this invention relate to an engine emission control system having a coated mixer and its method of use.

2. Background Art

Environmental regulations pertaining to the reduction of emissions from vehicular engines have been active in many countries. The oxides of nitrogen are of concern regarding emissions and include several compounds such as nitric oxide and nitrogen dioxide. These compounds are frequently referred to as $NO_x$ as defined by the United States Environmental Protection Agency.

$NO_x$ emissions from certain engines may be treated using a selective catalytic reduction (SCR) catalyst. The SCR system uses reducing agents, such as urea to yield satisfactory $NO_x$ conversion performance. Some recently designed delivery systems for the reducing agent involve delivery of a gas to the SCR.

In some systems the gas is generated by vaporizing a liquid reducing agent. Under these types of systems, vaporization of the liquid reducing agent to a gas can sometimes be incomplete. As a result, urea droplets may reach the face of an SCR catalyst. These droplets could lead to deposits of melamine and other solids resulting in diminished SCR performance. In addition, when the droplets or other materials are not evaporated and decomposed prior to contact with the SCR catalyst, part of the SCR catalyst must be used for this decomposition by hydrolysis. As a result, the SCR catalyst may be required to be relatively larger to achieve the same level of $NO_x$ conversion than if the droplets were not present.

What is needed is a system for thoroughly vaporizing and mixing the exhaust and the liquid reducing agent. The system should provide good effect during cold start engine $NO_x$ conversion operations while avoiding detrimental increases in back pressure on the emission control system.

SUMMARY OF THE INVENTION

An emission control system for remediating an exhaust from an internal combustion engine of a vehicle, having an exhaust passage for transporting exhaust gases form the engine. The system also includes an oxidation catalyst coupled to a portion of the exhaust passage and disposed downstream of the engine. The system has a source of a reducing agent cooperating with an aperture in the exhaust passage. The aperture is disposed downstream of the oxidation catalyst. A mixer is arranged within the exhaust passage downstream of the aperture. The mixer includes a plurality of mixing elements, at least a portion of which have a thermal conductivity greater than 8 W/m/° K when measured according to ASTM E 1225-04. In addition, there is a selective catalytic reduction (SCR) catalyst coupled to a wall of the exhaust passage and disposed downstream of the mixer. The mixer includes a coating disposed on at least a portion of the mixer. The coating is capable of hydrolyzing the reducing agent.

Another embodiment of the invention includes a metallic mixer having at least one mixing element. A coating is disposed on at least a portion of the mixing element. The coating includes a Lewis acid site. The coated mixing element has a thermal conductivity greater than 8 W/m/° K when measured according to ASTM E 1225-04.

Another embodiment of the invention includes a method for using a coated static mixer for an engine exhaust in an exhaust remediation system connected to an internal combustion engine. The method includes exposing a mixture of gaseous and liquid reducing agent from a source of a reducing agent. The mixer includes a mixing element having a coating capable of hydrolyzing the reducing agent. The coated mixing element has a thermal conductivity greater than 8 W/m/° K when measured according to ASTM E 1225-04. The source is disposed upstream of the inlet relative to the engine. The method also includes receiving the engine exhaust at the inlet to the mixer and transferring heat to the mixer from the engine exhaust. The liquid reducing agent is evaporated at the mixer and blended turbulently with the exhaust using the mixer element. The coating decomposes the reducing agent. The decomposed reducing agent and exhaust are released through an inlet of the mixer.

BRIEF DESCRIPTION OF THE DRAWINGS

FIG. 1 schematically illustrates an emission control system having a coated mixer for an internal combustion engine according to at least one embodiment of this invention;

FIG. 2 schematically illustrates a cross-sectional view along axis 2-2 in FIG. 1 of a coated mixer according to at least one embodiment of this invention; and FIG. 3 schematically illustrates a longitudinal cross-sectional view transverse to axis 3-3 in FIG. 1 of an alternative embodiment of a coated mixer according to at least one embodiment of this invention.

DETAILED DESCRIPTION OF THE PREFERRED EMBODIMENT(S)

Detailed embodiments of the present invention are disclosed herein. However, it should be understood that the disclosed embodiments are merely exemplary of the present invention, which may be embodied in various alternative forms. Moreover, the figures are not necessarily to scale, some features may be exaggerated or minimized to show details of particular components. Therefore, specific details disclosed herein are not to be interpreted as limiting, rather merely as a representative basis for the claims and/or for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

Referring now to FIG. 1, an exemplary emission control system 10 is illustrated in a non-limiting view. Emission control system 10 receives an exhaust 14 from an engine 12. Exhaust 14 enters the emission control system 10 at an intake 16 adjacent to the engine 12. The exhaust 14 travels in an exhaust passage of pipe 18 having a longitudinal axis, a portion of pipe 18 connects intake 16 with an oxidation catalyst 20. The oxidation catalyst 20 is part of the emission control system 10 which further includes a urea-based Selective Catalytic Reduction (SCR) 22 catalyst which is coupled downstream of the oxidation catalyst 20. In the illustrated embodiment, the emission control system 10 further includes a diesel particulate filter 24 downstream of the SCR catalyst 22. A reductant 26, such as a reducing agent like aqueous urea, is stored in a storage vessel 28 and delivered to a reductant delivery system 30 by a conduit 32. The delivery system 30 is coupled to a portion of the exhaust pipe 18 through an aperture upstream of the SCR catalyst 22. The reductant 26 is metered out by the delivery system 30, which comprises a pump 34 and a control valve 36, where both the pump 34 and the valve 36 are controlled by a controller 38.

In at least one embodiment, a coated mixer 42 is disposed intermediately between the control valve 36 and the SCR 22 catalyst. The coated mixer 42 hydrolyzes at least some of the reductant 26 and permits vaporization of residual droplets of the reductant 26. Air and reductant 26 are injected into the exhaust pipe 18 as a fan spray 40 with at least some of the reductant 26 being vaporized and dispersed by the coated mixer 42. The air and the reductant 26 form a resulting vapor which is then introduced into the exhaust gas 14 as a mixture and enters coated mixer 42. Alternatively, any other means known to those skilled in the art to deliver reductant 26 to an exhaust gas after-treatment device may be used.

The emission control system 10 may be arranged on the underside of a vehicle chassis in any suitable manner. It should be appreciated that the exhaust passage 18 may include one or more bends or curves to accommodate a particular vehicle arrangement. Further still, it should be appreciated that in some embodiments, the emission control system 10 may include additional components not illustrated in FIG. 1 or may omit certain components described herein. Elements of the emission control system 10, particularly those in contact with the exhaust passage 18 may be in fluid communication with other portions of the emission control system 10. Furthermore, it should be appreciated that the emission control system 10 may include two or more units of elements such as catalysts or control valves without departing from the spirit of the invention.

Any suitable oxidation catalyst 20 may be employed, such as a diesel oxidation catalyst. In at least one embodiment, the oxidation catalyst 20 is a precious metal catalyst, preferably one containing platinum, for conversion of hydrocarbons (HC), carbon monoxide (CO) and nitric oxide (NO) in exhaust 14 from engine 12. The oxidation catalyst 20 may also be used to supply heat for fast warm up of the SCR 22 catalyst and the coated mixer 42. The heat supply may be done, in part, by increasing the HC concentration in the exhaust gas 14 entering the oxidation catalyst 20. In oxidation catalyst 20, an exotherm is created when extra HC is reduced over the oxidation catalyst 20. This can be accomplished through, for example, in-cylinder injection during either or both of a power or exhaust stroke of the engine (in a direct injection engine) or any of a number of other alternatives such as retarding injection timing, increasing exhaust gas recycling (EGR) and intake throttling, or any other means known to those skilled in the art to increase the HC concentration in the exhaust gas 14. Alternatively, hydrocarbons may be injected directly into the exhaust gas 14 entering the oxidation catalyst 20 by employing any means known to those skilled in the art. In certain embodiments, HC from a fuel tank or a storage vessel may be delivered to oxidation catalyst 20 to generate extra heat to warm up SCR 22 catalyst and coated mixer 42.

In at least one embodiment, the diesel particulate filter (DPF) 24 is coupled downstream of SCR 22 catalyst and is used to trap particulate matter (soot) generated during the drive cycle of the vehicle. Any suitable DPF 24 can be used. DPF 24 can be manufactured from a variety of materials including cordierite, silicon carbide, and other high temperature oxide ceramics.

The reductant 26 is intended to reduce $NO_x$ generated during combustion in engine 12. Any suitable reductant can be used. As a non-limiting example, reductant 26 is a liquid reducing agent such as ammonium carbamate solution or urea. It is understood that other reducing agents known in the art may be used without departing from the spirit of this invention. Further, additives may be incorporated in the reducing agent, for example, to inhibit freezing during cold weather, without departing from the spirit of this invention.

The SCR catalyst 22 is intended to catalyze the reduction of nitrogen oxides with ammonia or other reductant 26 to form nitrogen and possibly water and/or other byproducts. Disposing the SCR 22 catalyst downstream allows the adsorption of ammonia, when used, and subsequent reaction with any $NO_x$ that slips through the upstream system. This leads to net $NO_x$ conversion ($NH_3 + NO \rightarrow N_2$).

Any suitable SCR 22 catalyst can be used. In at least one embodiment, the SCR 22 catalyst includes an SCR catalyst composition, preferably, a base metal/zeolite and/or transition metal/zeolite formulation with optimum $NO_x$ conversion performance in the range of 200-500° C. SCR 22 catalyst composition may also include a catalyst support composition. Such support composition can provide a mechanism for holding and dispersing the active components of SCR 22 catalyst composition. Further, the support compositions may increase the surface area for adsorption of species being altered by action of the SCR 22 catalyst. Suitable supports include but are not limited to $Al_2O_3$, $SiO_2$, $TiO_2$, $ZrO_2$, $CeO_2$ and combinations thereof. The support composition may be delivered to the SCR 22 catalyst composition via a molecular sieve, a sol-gel, or other process known to one of ordinary skill in the art. Further, the support composition can be provided as a powder and mixed with other components of the SCR catalyst composition in forming a slurry mixture to be applied by a washcoating process.

The SCR catalyst composition can also include a metal or metal-containing compound. Suitable non-limiting examples of metals include those from groups of metals known as the noble metal group (Ru, Rh, Pd, Os, Ir and Pt) and certain metals (Fe, Cu and Ag) from the group known as the late transition metal group.

The SCR catalyst composition may also include a composition of a cerium-containing oxide compound and a non-cerium-containing metal compound selected from the group consisting of alkali metal containing compounds, alkali-earth metal containing compounds, and combinations thereof. Suitable cerium-containing oxides include mixed oxide selected from the group consisting of Ce/Zr oxide, Ce/Pr oxide, Ce/Pr/Zr oxide, and combinations thereof.

The SCR catalyst composition may also include metal ions of a metal or metal-containing compound bonded to a conjugate base of an inorganic acid. The metal ions that are bonded to the conjugate base can be selected from the group consisting of alkali metal ions, alkali-earth metal ions, and combinations thereof. Suitable metal ions include, for example, ions derived from barium, lithium, sodium, potassium, cesium, magnesium, calcium, strontium and combinations thereof. Typically, the metal or metal-containing compound will alter the amount of chemical components in exhaust 14 (e.g., the NO, CO, $SO_2$, hydrocarbons, etc.). Moreover, the conjugate base of the inorganic acid can be a conjugate base oxide of an inorganic acid. As used herein in at least one embodiment of the present invention, "conjugate base" means the ion formed when an acid loses one or more hydrogen ions (i.e., H+). As used herein in at least one embodiment of the present invention, "conjugate base oxide" means a conjugate base that has one or more bonds between oxygen and another element.

In at least one embodiment, the inorganic acid for which the base oxide is conjugate has a $K_a$ such that SCR catalyst composition provides enhanced ammonia adsorption and/or increases the number of acid sites on SCR 22 catalyst for absorbing ammonia. Typically, this organic acid has a $K_a$ value from $5.0 \times 10^{-7}$ to about 1. Another variation of inorganic acid for which the base oxide is conjugate has a $K_a$ value from $5.0 \times 10^{-5}$ to about $1.0 \times 10^{-1}$.

SCR 22 catalyst may be able to obtain good catalytic activity under relatively high temperature conditions of use, for example, 400° C. or higher. The SCR process may not be as efficient at lower temperatures. In addition, rapidly changing air to fuel ratios may mean that there is an excess of ammonia after the SCR process. As a consequence, it may be preferred to have the diesel particulate filter 24 downstream of the SCR 22 catalyst to oxidize ammonia that escapes from the SCR process.

Referring now to FIG. 2, a schematic cross-sectional view of the coated mixer 42 is illustrated along axis 2-2 of FIG. 1. A non-limiting example of the mixer 42 is a static mixer. Static mixers are known to those skilled in the art. Static mixers are understood by those skilled in the art to be devices where fluid media are forced to mix themselves through a progression of divisions and recombinations. Typically, there are $2^n$ layerings of fluid media per n elements of mixing. Such devices are beneficial in harsh environments like the emission control system 10 because static mixers, typically, require no moving parts and, accordingly, maintenance and operating costs typically are extremely low. The energy for mixing, in the case of bringing a gaseous outflow into contact with the static mixer surfaces, is provided by the pressure under which the fluid flows through the static mixer. Typically, the pressure drop across the static mixer is low. It is understood that there may be a plurality of mixers disposed either longitudinally, laterally or both longitudinally and laterally.

The coated mixer 42 includes a peripheral wall 50. A metallic honeycomb 52 connects to the interior side of peripheral wall 50. Metallic honeycomb 52 includes a mixing element 54. Mixing element 54 may include a flap or deflecting element for redirecting exhaust gas 14 (FIG. 1) and any spray 40 ultimately towards the inlet face of SCR 22. Mixing element 54 increases the probability of the breakup of droplets of liquid spray as the droplets impact mixing element 54. Mixing element 54 further assists to disperse the mixture of exhaust gas 14 and reductant 26 relatively uniformly across the inlet face of SCR 22 catalyst thereby increasing the quantity of SCR 22 usable to remediate $NO_x$ and avoiding saturation of any particular section by exhaust 14 and reductant 26. These two factors may increase the relative efficiency of SCR 22, thereby providing a more robust remediation system and/or providing an opportunity for cost savings. It is understood that mixer 42 may have one or more mixing elements 54. A non-limiting example of the disposition of mixing element 54 includes multiple tabs inwardly directed from peripheral wall 50. The tabs are longitudinally and radially offset from each other both radially and longitudinally relative to the longitudinal axis of the mixer.

It is understood that there are many types of turbulent static mixers that may be used without violating the spirit of the invention. Typically, mixer 42 is a gas-liquid static mixer having turbulent and/or radial flow characteristics. Turbulent flow for certain embodiments of mixer 42 has a Reynolds number greater than about 2300. Other Reynolds numbers may be appropriate for alternative mixer setups, such as 2000 or 3000. Non-limiting examples of gas-liquid static mixers include low pressure drop mixers, low-low pressure drop mixers, jet mixers, interfacial surface generator mixers, HEV, and SMX turbulent static mixers.

It is understood that the mixing elements 54 cannot completely block exhaust pipe 18 and must permit exhaust 14 to communicate between oxidation catalyst 20 and SCR 22 catalyst. Typically, it is desirable to increase overall back pressure of the emission control system 10 by less than 3%.

Referring now to FIG. 3, a longitudinal cross-sectional view transverse to axis 3-3 of FIG. 1 is schematically illustrated according to at least one embodiment of this invention. Peripheral wall 50 supports mixing element 64. Mixing element 64 in this non-limiting example is a helical mixer 56 having at least one surface that is rotated at least 90°. Additional configurations of helical mixers may have rotations of at least 180°, 270°, 360° or 540° along a longitudinal axis without deviating from the spirit of the invention. However, it is to be understood that other types of mixing elements beyond those in FIGS. 2 and 3 could be used.

Bonded to the surface of mixing element 54 (FIG. 2) or 64 (FIG. 3) is a coating 58. The coating 58 is intended to react with (i.e., hydrolyze) reductant 26 to yield a chemical species capable of reacting with $NO_x$, particularly when combined with the catalyst coating of SCR 22 catalyst. An example of the reductant 26 is urea. Urea may come in contact with the coating 58 either as a gas or a urea solution fog comprising both gas and liquid droplets. The coating 58 may have a suitable thickness, or weight per unit area for relatively low heat capacity (thermal mass) while providing an adequate number of chemically active surfaces for hydrolysis of reductant 26. The range of coating weight on mixer 42 and/or mixing element 54 (FIG. 2) or 64 (FIG. 3) may range from 1-50 $gm/m^2$. It should be understood that the range of coating weight may be independently selected from more than 1, 5 or 10 $gm/m^2$ to less than 5, 10, 50 or 100 $gm/m^2$. However, in at least one embodiment, the coating 58 has a weight of 2-8 $gm/m^2$. Coating 58 is in fluid contact with the exhaust gas 14. Exhaust gas 14, which contains reductant 26, enters mixer 42 through an inlet 60. The blended mixture of reductant 26 and exhaust gas 14 exits through an outlet 62 of mixer 42 after reductant 26 is decomposed when in contact with coating 58. The blended mixture is transferred into SCR 22 catalyst.

Coating 58 may comprise active Lewis acid components such as metallic oxides, including alumina, titania, silica, zirconia, niobium pentoxide, tantalum pentoxide, and tungsten trioxide. The range of ratios of weight between alumina, when used, and other oxides may vary from less than 99:1, 95:5, 90:10, 75:25, or 50:50 to more than 40:60, 25:75, 10:90, 5:95, or 1:99. Typically, the ratio of alumina to other oxides may range from 99:1 to 25:75. The same ranges of ratios of weight may be used when using any of the two Lewis acid components. If three or more Lewis acid components are used in combination, the Lewis acid component having the largest portion typically may comprise at least 35 wt %. It should be understood that the Lewis acid component having the largest portion may comprise at least 25 wt % or at least 50 wt % without exceeding the spirit of the invention. When a mixed oxide, such as $Fe_2O_3$ in combination with $Fe_3O_4$ and/or FeO, comprises a portion of the Lewis acid components, the mixed oxide is consolidated into a theoretical stoichiometry for oxides having the same metal. An example is $FeO_{1.7}$ for a mixture of $Fe_2O_3$, $Fe_3O_4$, and/or FeO. The theoretical stoichiometry may be used for calculating relative ratios of Lewis acid components.

Further examples of Lewis acid components include a protonated zeolite or zeolite doped with transition metal dopants such as iron and copper, or lanthanide dopants such as cerium. For an iron-zeolite coating the range of content of iron may typically range from 0.1 to 15 wt %. However, the range may be independently chosen from 0.1 to 0.5, 1.0, or 1.25 wt % and less than 15, 10, 5, 3, 2.5 or 2 wt %. Iron may be doped into the zeolite by methods known in the art including ion exchange. The range of zeolite dopants may be 0.1 wt % to 30 wt %. More generally, the range of zeolite dopants may be selected independently from more than 0.1, 2, 5, or 10 wt % and less than 30, 20 or 15 wt %. The zeolite used may be any of the zeolites known in the art, such as ZSM, MFI and β-type zeolites.

Since the reaction of iron with water has a first dissociation constant $pK_a$ of 2.2 and a second $pK_a$ of 3.3, the pH of the solution will determine whether ion exchange doping occurs at a monovalent, divalent or trivalent condition. The resulting iron zeolites typically have $pK_a$ values in the range of 3.5 to 4.5, depending upon the zeolite used. The $pK_a$ of the iron zeolite or, in general, any Lewis acid component may influence the number availability of hydrolysis sites for the component. The number and availability may vary the volume of hydrolysis catalyst required for exhaust 14 space velocity and the quantity of reductant 26 metered into the emission control system 10.

It should be understood that solid ion exchange of zeolites with iron (II) chloride and iron (III) chloride may be necessary for complete exchange. The mixture may then be heated in streaming nitrogen at about 300° C. for two hours to complete the ion exchange. The exchange to zeolite may be washed with water and dried at 120° C. The mixture is then held at constant temperature of 300° C. for two hours in nitrogen. The zeolite catalyst may be applied to the mixing element 54 (FIG. 2) or 64 (FIG. 3) by suspending the powder and water with a binder. It should be understood that combinations of these compositions may be used in various embodiments of coating 58 without exceeding the spirit of this invention.

The coating 58 may be applied to mixing element 54 (FIG. 2), 64 (FIG. 3) and/or mixer 50 in a single pass or in multiple passes in thicknesses from 0.0005 inch to 0.1 inch. An example of multiple passes includes a washcoat layer followed by applied metal ions. Washcoat loadings of mixing element 54 (FIG. 2) or 64 (FIG. 3) can be provided in the range of 1-35 $mg/in^2$ of mixing element surface area. The washcoat of the coating 58 may have a surface area typically ranging from 10 to 400 $m^2/gm$ before exposure to exhaust 14. Alternatively, ranges of surface area may include 25-300 $m^2/gm$, or 50-150 $m^2/gm$ before exposure to exhaust 14 without violating the intent of the invention. A heat-treated washcoat of coating 58 may have a surface area ranging from 1-250 $m^2/gm$, 10-200 $m^2/gm$, or 50-100 $m^2/gm$.

A washcoat of the coating 58 may be applied to mixing element 54 (FIG. 2) or 64 (FIG. 3) and then impregnated with additional metals from solution, if desired.

In certain embodiments, the coating 58 may be applied to mixing elements 54 (FIG. 2) or 64 (FIG. 3) by sol-gel techniques from heterometallic alkoxides. The use of sol-gel techniques appear to improve the distribution of alkali metals, alkali-earth, lanthanides and zirconia as opposed to impregnation methods. The particle size of the oxides of alkali metals, alkali-earth, and lanthanides remain small, in a range of about 2 to 10 nm, compared to that provided by any impregnation method. This provides a larger number of reaction sites for the hydrolysis reaction. More specific details of methods for preparing sol-gel coatings are provided by Narula and Nakouzi-Phillips in U.S. Pat. No. 6,153,272 which is incorporated here by reference. Still other ways of providing the invention for use will be apparent to those skilled in the art in view of the present disclosure.

It is beneficial for the mixing element 54 (FIG. 2) or 64 (FIG. 3) to heat up quickly during cold-start engine operations so that the residual droplets of liquid reducing agent may be vaporized and not be passed to the SCR as a liquid. The mixing element 54 (FIG. 2) or 64 (FIG. 3) may have a thermal conductivity greater than 8 watts per meter per degree Kelvin (W/m/° K). The mixing element 54 (FIG. 2) or 64 (FIG. 3) may also have thermal conductivity greater than 10 W/m/° K, 12 W/m/° K, 15 W/m/° K, 30 W/m/° K, 75 W/m/° K, or 100 W/m/° K when measured according to ASTM E 1225-04. It is advantageous if the coating 58 does not significantly decrease the thermal conductivity of mixing element 54 (FIG. 2) or 64 (FIG. 3) to less than 8 W/m/° K or an absolute decrease relative to the uncoated mixing element 54 (FIG. 2) or 64 (FIG. 3) of more than 10 W/m/° K. The absolute decrease in thermal conductivity associated with the coating may be more than 2, 3, or 5 W/m/° K without departing from the spirit of the invention.

The quickness with which the combined mixing element 54 (FIG. 2) or 64 (FIG. 3) and coating 58 become hydrolytically active may also reflect heat capacity (thermal mass) of the mixer 50, mixing element 54 (FIG. 2) or 64 (FIG. 3), and coating 58. A range of a ratio of the heat capacity of the mixer 50 to the heat capacity of the SCR 22 may be 0.001 to 0.95. The range may be independently chosen from 0.001, 0.005, 0.01, or 0.1 to 0.5, 0.75, 0.90 or 0.95 without departing from the spirit of the invention. A range of a ratio of the heat capacity of the coated mixing element 54 (FIG. 2) or 64 (FIG. 3) to the heat capacity of the SCR 22 may be 0.1 to 0.90. The range may be independently chosen from 0.01, 0.05, or 0.10 to 0.5, 0.75, 0.90, or 0.95 without departing from the spirit of the invention.

The improved effectiveness of emission control system 10 including mixer 42 with mixing elements 54 (FIG. 2) or 64 (FIG. 3) and coating 58 may be demonstrated in vehicles during testing using the standard test for cold-start emissions on light-duty vehicles, EPA FTP-75. The relative standard against which the present invention is compared is a 400-cell/ $in^2$ ceramic honeycomb having an equivalent coating. Since the hydrolysis process may take place on the mixer instead of using additional SCR 22 catalyst volume, the estimated $NO_x$ conversion is up to 20% greater relative to a system not including the mixer 42 with coating 58. SCR 22 derives advantages from the "freed up" volume that would otherwise be engaged in hydrolysis since the hydrolysis function has already occurred on the coating 58.

Using mixer 42, such as a coated static mixer, for remediating $NO_x$ from an internal combustion engine involves receiving reductant 26, such as a mixture of gaseous and liquid reducing agent, from the source 28 of reductant agent 26 (FIG. 1). It is understood that the mixture can range from entirely gaseous to substantially liquid without violating the intent of this invention. The mixture of reductant 26 is received at the inlet 60 to mixer 42. Mixer 42 is disposed downstream from inlet 60 and includes mixing element 54 (FIG. 2) or 64 (FIG. 3) having coating 58. Coating 58 including the metal-zeolite composition capable of hydrolyzing the reducing agent. At substantially the same time as the mixture of reductant 26 arrives at the mixer, engine exhaust 14 (FIGS. 1 and 3) also arrives at inlet 60 to mixer 42. It is understood that engine exhaust 14 may arrive at mixer 42 without any reductant 26. Engine exhaust 14 transfers heat to mixer 42 which heats up rapidly due to its relatively low thermal mass, and its relatively high thermal conductivity, such as being greater than 9 W/m/° K or comparable to stainless steel at 15 w/m/° K. The warmed coated mixer 42 may evaporate the liquid reductant 26 and blend it turbulently with the exhaust 14 using the mixer element 54 (FIG. 2) or 64 (FIG. 3). As a consequence of reductant 26 coming in contact with coating 58, reductant 26 is decomposed. Decomposed reductant 26 and exhaust 14 are released from mixer 42 through the outlet 62 of mixer 42.

While the best mode for carrying out the invention has been described in detail, those familiar with the art to which this invention relates will recognize various alternative designs and embodiments for practicing the invention as defined by the following claims.

What is claimed:

1. An emission control system for remediating an exhaust from an internal combustion engine of a vehicle, the emission control system comprising:
   an exhaust passage for transporting exhaust gases from the engine;
   an oxidation catalyst coupled to a portion of the exhaust passage and downstream of the engine;
   a source of a reducing agent cooperating with an aperture in the exhaust passage, the aperture disposed downstream of the oxidation catalyst;
   a mixer arranged within the exhaust passage downstream of the aperture, the mixer including a plurality of mixing elements and a coating disposed upon the mixing elements; and
   a selective catalytic reduction (SCR) catalyst coupled to a wall of the exhaust passage, and disposed downstream of the mixer;
   wherein the coating hydrolyzes the reducing agent and the mixer has a thermal conductivity of at least 8 W/m/° K when measured according to ASTME 1225-04, the mixer evaporating a greater amount of reducing agent during a cold start procedure for the engine relative to an equivalent mass of a 400-cell/in$^2$ ceramic substrate using test method EPA FTP-75.

2. The emission control system of claim 1, wherein the coated mixing element and the SCR have a heat capacity ratio that ranges from 0.001 to 0.95.

3. The emission control system of claim 1, wherein the mixer is a gas-liquid static mixer.

4. The emission control system of claim 3, wherein the gas-liquid mixer is an SMX mixer.

5. The emission control system of claim 1, wherein the coating comprises a Lewis acid.

6. The emission control system of claim 5, wherein the coating includes an iron-zeolite having an iron content ranging from 0.1 to 15 wt %.

7. An emission control system capable of transporting exhaust gases from an internal combustion engine, the emission control system comprising:
   a metallic mixer having at least one metallic mixing element; and
   a coating disposed on at least a portion of the metallic mixing element, the coating reacting with a reductant, wherein the coated mixing element has a thermal conductivity greater than 8 W/m/° K when measured according to ASTM E 1225-04, the coated mixing element evaporating a greater amount of the reductant during a cold start procedure for the engine relative to an equivalent mass of a 400-cell/in$^2$ ceramic substrate using test method EPA FTP-75.

8. The emission control system of claim 7, further comprising:
   an exhaust passage for transporting exhaust gases from the engine, the coated mixer being disposed within the passage;
   a source of the liquid reducing agent, the agent being catalytically hydrolyzed by the coating, the source disposed to introduce the reducing agent upstream of the mixer relative to the engine.

9. The emission control system of claim 8, further comprising a selective catalytic reduction (SCR) catalyst disposed within the passage downstream of the mixer, wherein a heat capacity ratio of the mixer to the SCR ranges between 0.001 and 0.95.

10. The emission control system of claim 8, further comprising an oxidation catalyst disposed in the passage upstream of the source of reducing agent.

11. The emission control system of claim 7, wherein the mixer has a longitudinal axis and includes a peripheral wall having a plurality of tabs inwardly directed from the peripheral wall, the tabs being longitudinally and radially offset from each other along the longitudinal axis.

12. The emission control system of claim 7, wherein the mixer has a longitudinal axis and a helical configuration.

13. The emission control system of claim 7, wherein the coating includes a dopant-containing zeolite.

14. The emission control system of claim 13, wherein the dopant content ranges from 0.1 to 30 wt %.

15. The emission control system of claim 7, wherein the coating includes a component selected from the group consisting of ZSM zeolite, MFI zeolite, beta-type zeolite, titania, silica, aluminosilicate, zirconia, iron-zeolite, copper-zeolite, cerium-zeolite and metal oxides.

16. The method of using a coated static mixer for an engine exhaust in an exhaust remediation system connected to an internal combustion engine, the method comprising:
   exposing a mixture of gaseous and liquid reducing agent from a source of a reducing agent to a mixer, the mixer including a mixing element having a coating hydrolyzing the reducing agent, the coated mixing element having a thermal conductivity greater than 8 W/m/° K when measured according to ASTM E 1225-04, the source being disposed upstream of the inlet relative to the engine;
   receiving the engine exhaust at the inlet to the mixer;
   transferring heat to the mixer from the engine exhaust;
   evaporating the liquid reducing agent at the mixer in an amount greater than the amount of liquid reducing agent evaporated from an equivalent mass of 400-cell/in$^2$ ceramic substrate during a cold start procedure when measured according to test method EPA FTP-75;
   blending turbulently the reducing agent with the exhaust using the mixer element;
   decomposing the reducing agent; and
   releasing the decomposed reducing agent and exhaust through an outlet of the mixer.

17. The method of claim 16, wherein the coating includes an iron-zeolite.

18. The method of claim 17, wherein the iron content ranges from 0.1 to 15 wt %.

19. The emission control system of claim 7, wherein the coating includes two or more Lewis acids having $pK_a$ values ranging from 3.5 to 4.5 increasing the thermal conductivity of the coated mixing element to greater than 10 W/m/° K while evaporating the greater amount of liquid reducing agent relative to the equivalent mass of the 400-cell/in$^2$ ceramic substrate when increasing the number of available Lewis acid sites in the coating in order to decrease the coating thickness.

20. The emission control system of claim 7, wherein the coating is disposed immediately adjacent to a metallic surface of the metallic mixing element.

\* \* \* \* \*